United States Patent [19]
Roshangar

[11] Patent Number: 5,996,750
[45] Date of Patent: Dec. 7, 1999

[54] HYDROKINETIC TORQUE CONVERTER FOR AN AUTOMATIC TRANSMISSION

[75] Inventor: Mansoor Roshangar, Northville, Mich.

[73] Assignee: Ford Global Technologies, Inc., Dearborn, Mich.

[21] Appl. No.: 09/110,287

[22] Filed: Jul. 6, 1998

[51] Int. Cl.[6] ................................................. F16H 46/02
[52] U.S. Cl. ........................................................ 192/3.29
[58] Field of Search ................................ 192/3.28, 3.29, 192/212

[56] References Cited

U.S. PATENT DOCUMENTS

| | | |
|---|---|---|
| 4,173,270 | 11/1979 | Croswhite et al. . |
| 5,020,646 | 6/1991 | Koshimo . |
| 5,046,591 | 9/1991 | Hageman et al. . |
| 5,062,517 | 11/1991 | Muchmore et al. . |
| 5,334,112 | 8/1994 | Nogle et al. ........................ 192/3.29 X |
| 5,400,884 | 3/1995 | Matsuoka . |
| 5,667,042 | 9/1997 | Olsen et al. ............................ 192/3.29 |
| 5,713,442 | 2/1998 | Murata et al. .......................... 192/3.29 |

*Primary Examiner*—Charles A. Marmor
*Assistant Examiner*—Saul Rodriguez

[57] ABSTRACT

A hydrokinetic torque converter for use in a motor vehicle driveline includes a bladed impeller, a bladed turbine and a bladed stator arranged in mutual fluid flow relationship, a housing surrounding the turbine's impeller and stator, a hydraulically actuated bypass clutch producing a direct mechanical connection between the impeller and turbine, the turbine wheel and clutch plate supported on a first turbine hub, a clutch damper fixed to the clutch plate and secured to a second hub, which is driveably connection to a transmission input shaft.

9 Claims, 1 Drawing Sheet

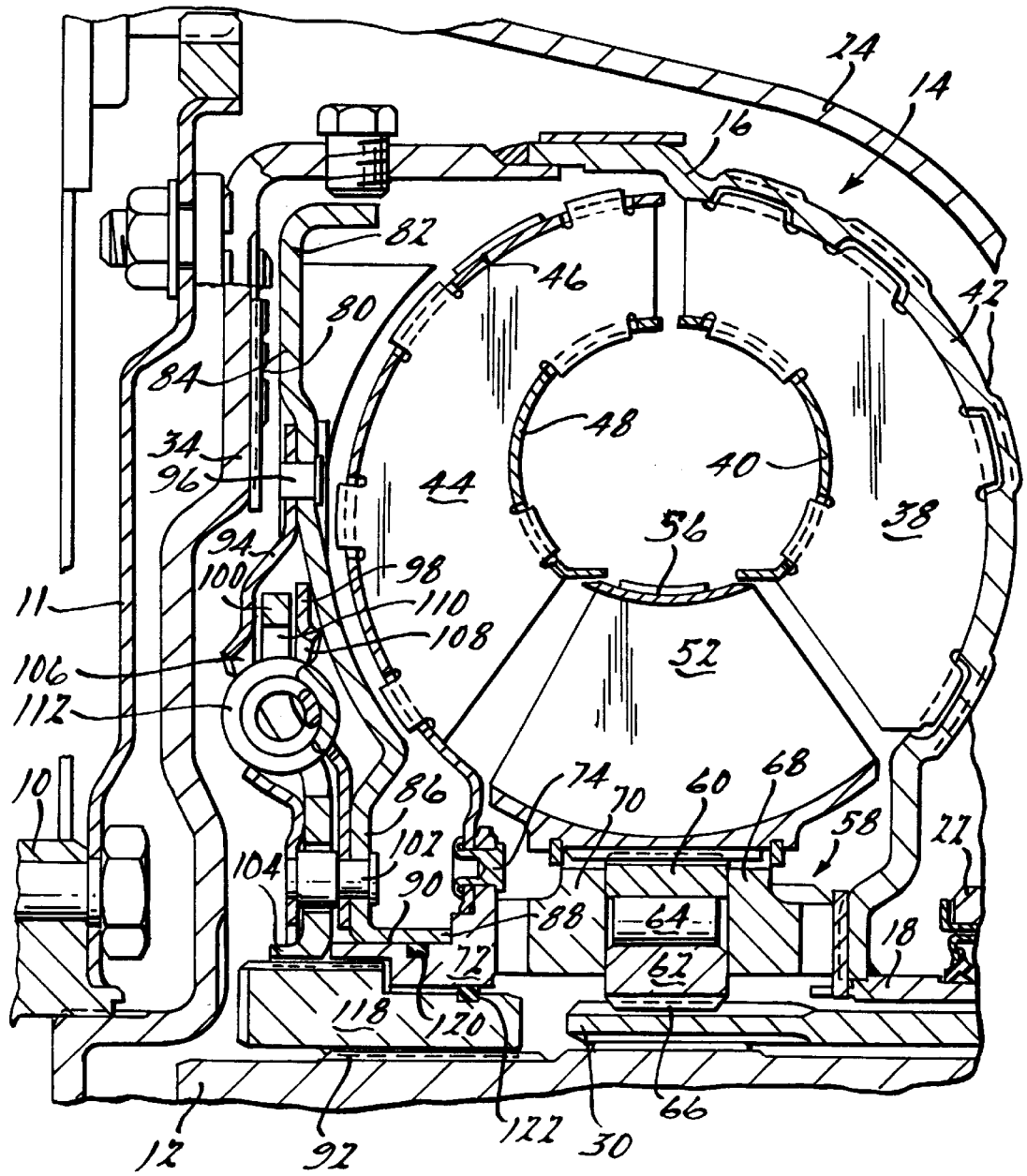

HYDROKINETIC TORQUE CONVERTER FOR AN AUTOMATIC TRANSMISSION

BACKGROUND OF THE INVENTION

1. Field of the Invention

This invention relates to hydrokinetic torque converter for motor vehicles, more particularly, the invention pertains to a torque converter having a bladed turbine wheel, bypass clutch and clutch damper.

2. Description of the Prior Art

Torque converters for automatic transmissions conventionally employ a one-piece turbine hub, on which hub a bladed turbine wheel is rotatably mounting for rotation about the central axis of the torque converter. The turbine hub is joined by a spline connection to the turbine shaft, a transmission input shaft which carries torque from the engine to planetary gear sets that produce multiple speed ratios. Engine torque is transmitted through the turbine hub and the axially directed spline to the input shaft. In normal operation, the torque converter contains hydraulic fluid at fairly high pressure, which causes the impeller cover to distort from its normal shape. Distortion coupled by the engine torque amplified by converter torque ratio causes the spline connection between the turbine hub and turbine shaft to lock, thereby inducing excessive load on the engine crankshaft main thrust bearing. Furthermore, the distortion causes a leakage gap particularly in the region between the impeller exit and the turbine entrance in the converter torodial flow path. This leakage causes converter inefficiency.

Distortion of the impeller cover causes movement of the impeller wheel toward the transmission gear sets and movement of the impeller cover toward the engine. The turbine also moves toward the converter cover when the bypass clutch is operating in the lockup mode due to hydraulic pressure in the torodial flow path. Torque converter ballooning leaves an excessive gap between the impeller and turbine. Engine torque, which is transmitted from the engine crankshaft through converter cover to the torque converter and is amplified by the torque converter, causes locking of the spline connection between the turbine hub and input shaft. Due to the large hydraulic pressure on the converter cover during operation with the bypass clutch open, the torque converter moves toward the engine causing deflection of the engine flywheel and loading the engine crankshaft until deflection of the flywheel exceeds the gap between the turbine and impeller. If the flywheel is rigid, its deflection will be less than the gap between the impeller and turbine, and the crankshaft will be continually loaded due to distortion of the impeller casing.

BRIEF DESCRIPTION OF THE DRAWING

The FIGURE is a partial cross-section through a radial plane of a torque converter according to this invention. The device is substantially symmetric about an axial centerline.

DESCRIPTION OF THE PREFERRED EMBODIMENT

In the FIGURE, numeral 10 designates a flange on the crankshaft of an internal combustion engine, which is driveably connected to a flywheel 11 that carries a starting gear at its radially outer periphery. Numeral 12 designates a turbine shaft, which is adapted to be connected to the torque input element of a multiple ratio gear system in the driveline of the motor vehicle. A hydrokinetic torque converter 14 provides a hydrokinetic torque delivery path between the crankshaft flange 10 and turbine shaft 12.

The torque converter 14 includes an impeller cover 16 formed in the shape of a semi-torus. It is provided with a hub 18 journaled in a bearing support wall 22 that forms a part of the automatic transmission housing 24. Support wall 22 defines a pump cavity for receiving pumping gear elements, which are connected driveably to the hub 18.

The impeller cover includes an end wall 34, which is secured at its periphery to the impeller cover and forms an integral part of a clutch.

The impeller cover carries impeller blades 38, which cooperate with inner shroud 40 and the interior wall 42 of the impeller cover to define radial out flow passages. Turbine blades 44 cooperate with an outer turbine shroud 46 and an inner turbine shroud 48 to define radial inflow passages, the impeller passages and turbine passages defining a part of a torus circuit.

A bladed stator 50 is located between the flow exit region of the turbine blades 44 and the flow entrance region of the impeller blades 38. Stator 50 includes radially disposed blades 52 secured to hub 54. A stator shroud 56 is located at the outer edge of the stator blades 52.

An overrunning brake 58, located within hub 54, includes an outer race 60, inner race 62, and intermediate clutch roller 64 located between the races. The race 60 is provided with cam surfaces that are engaged by rollers 64 to lock the races together when race 60 tends to rotate relative to race 62 in one direction and to prevent free-wheeling motion of race 60 relative to race 62 in the opposite direction. Race 62 is splined at 66 to the stator sleeve shaft 30.

A thrust ring 68 is located on one side of the races 60 and 62 adjacent a radially inward portion of the impeller housing 16. Another thrust ring 70 is located on the opposite side of races 60, 62 directly adjacent turbine hub 72, which is connected driveably to the turbine shroud by rivets 74.

The cover wall 34 carries an annular friction surface 80 located at a radially outward location. A bypass clutch disc 82 is located adjacent the wall 34 and is provided with an annular friction surface 84 located at a radially outward position adjacent surface 80. Disc 82 is provided with a hub 86, which is piloted by flange 88 on a axial directed extension surface 90 of radially outer hub 72. Hub 72 is splined at 104 to a radially inner hub 118.

Clutch disc 82 and damper plate 94 are mutually connected by rivets 96 spaced angularly about the axis of the assembly and located near the radially outward periphery of damper plate 94. A second damper plate 98, located at the opposite axial side of drive plate 100 from the location of the damper plate 94, extends radially inward to a connection to disc 82 made by rivets 102 spaced angularly about the axis of the assembly. Rivets 102 also connect the radially inner end of damper plate 94 and drive plate 100 to clutch disc 82. Drive plate 100 is driveably connected by a spline 104 to the turbine hub 72.

The damper plates 94, 98 define cooperating flanged aligned openings 106, 108, and drive plate 100 provides another opening 110, aligned with the flanged openings of the damper plates, the openings arranged to receive therein compression springs 112. The springs are mutually spaced angularly about the axis of the assembly and are fitted within the drive plate 100 and damper plates 94, 98 so that the axial ends of the springs are adapted to contact surfaces of the drive plate and damper plates as they rotate relative to one another about the axis of the assembly. In this way, the damper assembly continually attenuates impact that occurs as the clutch disc is applied and reduces vibration and harshness that may occur between the clutch disc 82 and turbine hub 72. Reference may be made to U.S. Pat. Nos. 2,318,620; 2,042,570; and 2,687,627 for examples of friction clutch dampers of this type, the entire disclosures of which are incorporated herein by reference.

Drive plate 100 includes a hub in the form of an axially directed flange, which is driveably connected by a spline 104 to the inner hub 118. Hub 72 of the turbine wheel is sealed against the passage of hydraulic fluid at 120 on the hub 88 of the clutch disc 82 and at 122 on a radially outer surface of hub 118. Preferably seals 120 and 122 are o-ring seals, each fitted within an annular recess and resiliently contacting the adjacent surfaces to be sealed. Hub 118 is driveably connected to the turbine shaft 12 by a spine 92.

In the dual turbine hub assembly according to this invention, a spline lock condition occurs only on the inner hub 118, but the outer turbine hub 72 is free to move toward the impeller during all converter operating conditions. The larger spline of this assembly, in comparison to the smaller splines of the prior art, require minimal hydraulic pressure to prevent spline lock. Free movement of the turbine wheel toward the impeller will decrease the total load on the engine crankshaft 10 due to the reaction force of the turbine, which is applied continually. In addition, free movement of the turbine toward the impeller maintains a small gap between impeller and turbine; therefore, it prevents high pressure flow leakage through the gap from the torodial flow path. Leakage from the gap would reduce converter performance and efficiency.

The dual hub design according to the present invention can be incorporated readily to current production torque converters without modification of adjacent parts.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed is:

1. A hydrokinetic torque converter for a motor vehicle, comprising:

a bladed impeller and bladed turbine arranged in mutual toroidal fluid flow relation;

a turbine shaft extending axially;

a first hub encircling and driveably connected to the turbine shaft;

a second hub encircling the first hub, driveably connected at a radially outer position to the first hub preventing rotation relative to the first hub and permitting axial displacement relative to the first hub, fixed to and rotatably supporting the turbine thereon;

a seal restricting passage of hydraulic fluid between the first hub and second hub; and a clutch having a first element continuously connected to the impeller, and a clutch disc driveably connected to the first hub, operative alternately to connect driveably the impeller and turbine shaft and to release said connection.

2. The torque converter of claim 1, further comprising a damper, including:

a drive plate driveably connected to the second hub, having first angularly extending, mutually spaced openings therein;

a damper plate fixed to the clutch disc having second angularly extending, spaced openings therein aligned with the first openings; and a compression spring located in each opening, each spring having a first end adapted to contact the damper plate and a second end adapted to contact the drive plate in response to relative movement therebetween, the springs being compressed by such relative movement.

3. The torque converter of claim 2, wherein the first hub is driveably connected by a first spline to the turbine shaft; and the second hub, connected by a second spline to the first hub at a position radially outer from the position of the first spline, and supporting the clutch disc for movement relative thereto, the drive plate being connected to the second hub by driveable engagement with the second spline.

4. The torque converter of claim 1, wherein said clutch comprises:

a first surface continuously connected to the impeller, and a second surface carried on the clutch disc, slidably supported on the second hub for movement relative to the first element, whereby the first and second surfaces are mutually driveably engaged and disengaged.

5. The torque converter of claim 1, wherein the first hub is driveably connected by a first spline to the turbine shaft; and the second hub, connected by a second spline to the first hub at a position radially outer from the position of the first spline, and supporting the clutch disc for movement relative thereto.

6. A hydrokinetic torque converter for a motor vehicle, comprising:

a bladed impeller and bladed turbine arranged in mutual toroidal fluid flow relation;

a turbine shaft extending axially;

a first hub encircling and driveably connected by a first spline to the turbine shaft;

a second hub encircling the first hub, driveably connected to the first hub by a second spline at a position radially outward from the position of the first spline preventing rotation relative to the first hub and permitting axial displacement relative to the first hub, fixed to and rotatably supporting the turbine thereon, and supporting the clutch disc for movement relative thereto;

a seal restricting passage of hydraulic fluid between the first hub and second hub; and a clutch having a first element continuously connected to the impeller, and a clutch disc driveably connected to the first hub, operative alternately to connect driveably the impeller and turbine shaft and to release said connection.

7. The torque converter of claim 6, further comprising a damper, including:

a drive plate driveably connected to the second hub, having first angularly extending, mutually spaced openings therein;

a damper plate fixed to the clutch disc having second angularly extending, spaced openings therein aligned with the first openings; and a compression spring located in each opening, each spring having a first end adapted to contact the damper plate and a second end adapted to contact the drive plate in response to relative movement therebetween, the springs being compressed by such relative movement.

8. The torque converter of claim 6, wherein said clutch comprises:

a first surface continuously connected to the impeller, and a second surface carried on the clutch disc, slidably supported on the second hub for movement relative to the first element, whereby the first and second surfaces are mutually driveably engaged and disengaged.

9. The torque converter of claim 7, wherein:

the first hub is driveably connected by a first spline to the turbine shaft; and the second hub, connected by a second spline to the first hub at a position radially outer from the position of the first spline, and supporting the clutch disc for movement relative thereto, the drive plate being connected to the second hub by driveable engagement with the second spline.

\* \* \* \* \*